Oct. 3, 1967  J. F. MUSGROVE  3,344,818
CHAIN SAW GUARD
Filed Feb. 12, 1965

INVENTOR.
JOHN F. MUSGROVE
BY Eugene M. Eckelman
ATTORNEY

United States Patent Office 3,344,818
Patented Oct. 3, 1967

3,344,818
CHAIN SAW GUARD
John F. Musgrove, Box 583, Sutherlin, Oreg. 97479
Filed Feb. 12, 1965, Ser. No. 424,257
7 Claims. (Cl. 143—32)

ABSTRACT OF THE DISCLOSURE

A chain saw guard having as a first feature thereof to include a housing adapted to fit over the saw bar of a chain saw to protect the saw from accidental damage as well as to protect the operator from the saw when he is carrying the same. The guard has a grip handle thereon to assist in carrying the saw when the guard is attached. In addition, the guard includes a cushion thereon between its end to form a shoulder cushion when the saw is packed from place to place by the operator.

---

This invention relates to a guard for chain saws, and more particularly pertains to a guard arranged to be placed on the chain saw when the latter is not in use in order that the operator can carry or otherwise manipulate the saw without injury to himself or without damaging the saw.

The most convenient manner for an operator to carry a chain saw for an appreciable distance is to place the saw blade on his shoulder with the motor portion projecting rearwardly and to hold onto the front end of the chain saw bar. The chain saw teeth, however, cut into the operator's shoulder and make it uncomfortable to carry this way. Also, the saw bar may be quite hot from operation of the saw in a cut. It is customary either to wrap the blade or place a pad on the shoulder to protect the operator but such amounts to an inconvenient process. Furthermore, the saw bar and chain are not appreciably protected and can easily be damaged if the saw is dropped or if it is struck by external forces when in storage or otherwise not in use.

It is, therefore, a primary objective of the present invention to provide a chain saw guard of hollow construction adapted conveniently to be placed over the saw and saw bar of a conventional chain saw mechanism whereby to protect the operator while carrying the same and also to protect the saw.

Another object is to provide a guard of the type described including spring securing means arranged to provide detachable connection of the guard to the saw and also including a shoulder pad on one surface thereof providing a comfortable engaging portion for the operator's shoulder.

A further object is to provide a guard of the type described having a grip handle disposed adjacent the end of the enclosed saw bar whereby the operator can readily hold onto the saw when carrying it on his shoulder.

Still a further object is to provide a guard of the type described adapted also to cover portions of the saw housing.

Another object is to provide a guard for chain saws which is extendable in length whereby to facilitate its use with chain saw blades of variable length.

Additional objects will become apparent from the following specification and claims, considered together with the accompanying drawings, wherein the numerals of reference indicate like parts.

Figure 1:
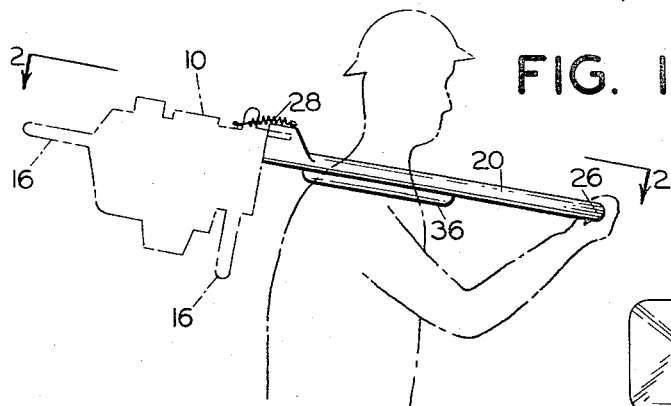
FIGURE 1 is a bottom edge view of a first embodiment of the present guard, the guard being applied to a chain saw and the chain saw being carried by an operator.

Referring now in detail to the drawings and first to FIGURES 1–4 which show a first form of the invention, the present guard is intended for use with a conventional chain saw. Such a saw comprises a motor housing 10, a saw bar 12, an endless chain saw 14 operable over the saw bar, and suitable handles 16. This type of saw also has a plurality of prongs 18 on the forward end of the motor housing for obtaining a leverage sawing grip on logs.

Figure 3:
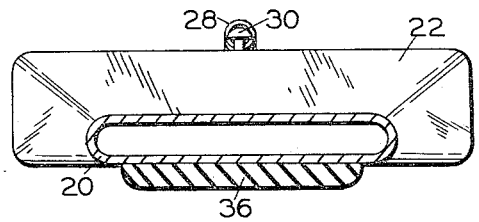
FIGURE 3 is an enlarged sectional view taken on the line 3—3 of FIGURE 2.

The gist of the present invention is to provide a guard, designated generally by the numeral 20, adapted to cover the saw bar. This guard is of flat tubular construction and open at one end so as to be moved in telescoping relation over the free end of the saw bar. The cross sectional shape of the guard is best illustrated in FIGURE 3 wherein it comprises the flat tubular construction described and of a size to freely receive the saw bar. The inner end of the guard 20 is enlarged at 22 to receive the pronged portion of the saw housing. Thus in addition to covering the saw bar and blade the guard covers the prongs 18.

Figure 2:
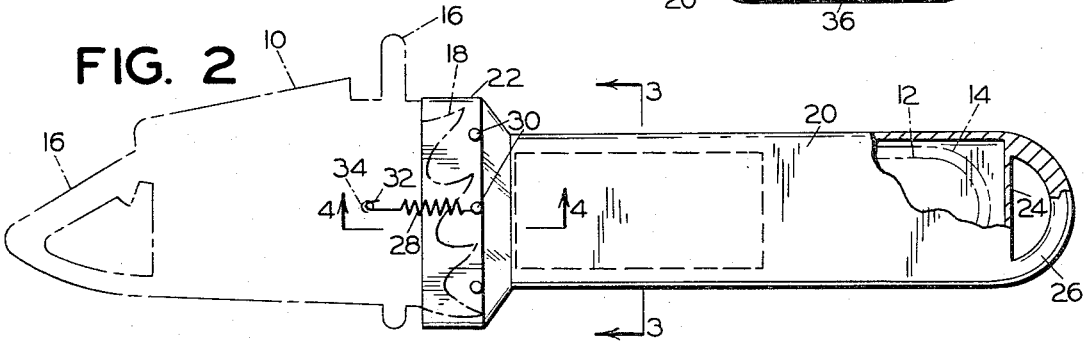
FIGURE 2 is a side elevational view of the guard of FIGURE 1 taken on the line 2—2 of FIGURE 1, a chain saw to which the guard is attached being shown in phantom lines.

The outer end of the guard has an end wall 24, FIGURE 2, beyond which extends a semi-circular loop 26 serving as a grip handle for carrying the saw with the guard in place.

At least one tension spring 28 is associated with the guard for holding it removably on the saw, and for this purpose one end of the guard has one or more connections 30 arranged to be engaged by one end of the spring. The spring has hooks 32 on its ends adapted to engage a connector 30 and any suitable projection 34 which may exist on the saw housing, it being apparent that any number of projections 34 such as bolt heads or the like may be present on the saw housing and in various locations. Several of the connectors 30 are preferably provided on the guard to permit the spring 28 to be positioned where necessary to engage a suitable projection 34 on the motor housing 10.

Secured to one flat surface of the guard 20, and more particular the surface thereof which will engage the operator's shoulder when he carries the saw, is a pad 36 of suitable soft material such as sponge rubber, resilient plastic, or the like. This pad is positioned lengthwise of the guard such that when the operator carries the saw it will bear on his shoulder. For this purpose, the pad will usually be located toward the open or saw end of the guard as shown.

The present guard is readily inserted on the saw by moving it telescopically over the end of the saw bar and connecting the spring 28. Thereupon the saw can be carried without any danger of the operator being cut by the saw teeth or by the prongs 18. Furthermore, the saw teeth are protected from injury in the event the saw is dropped or is struck accidentally by external forces, when being stored or otherwise not being used.

Figures 4, 6:
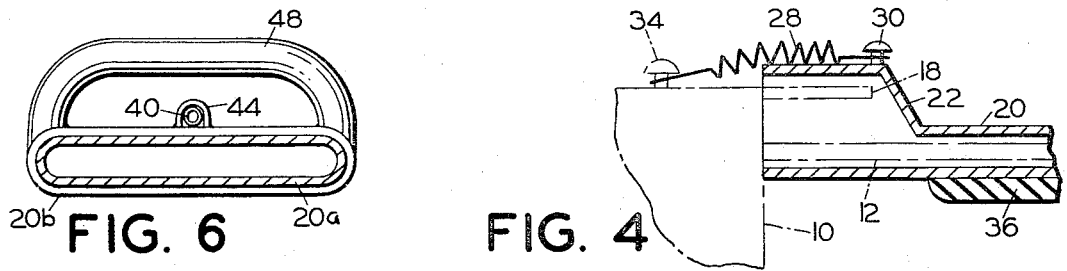
FIGURE 4 is an enlarged, fragmentary sectional view taken on the line 4—4 of FIGURE 2.
FIGURE 6 is an enlarged cross sectional view taken on the line 6—6 of FIGURE 5.
Figure 5:
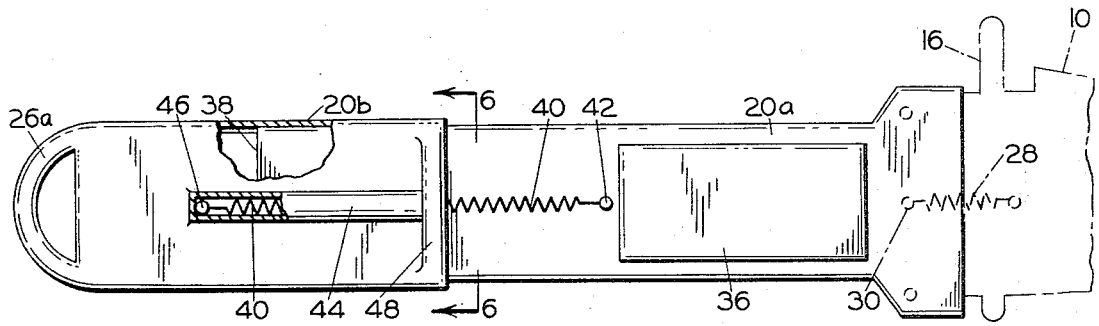
FIGURE 5 is a side elevational view of a second embodiment of the guard.

FIGURES 5 and 6 show a second form of the invention intended to fit many different lengths of saw bars. This embodiment includes a first guard portion 20a which telescopically supports a second guard portion 20b. The portion 20a is open at its outer end for projection therethrough of the saw bar and the outer end of the portion 20b is closed and has a loop 26a which serves as a grip handle.

The guard portions 20a and 20b are urged into telescoping relation by a tension spring 40 connected at one end to an anchor pin 42 on one side surface of the guard portion 20a and leading into a tubular housing 44 projecting along a side surface and forming a part of the guard portion 20b. The inner end of the spring 40 is anchored to a pin 46 disposed at the inner end of the housing 44. Spring 40 thus normally pulls the guard portion 20b into its maximum telescoping relation with the guard portion 20a, but when a saw bar is to be covered which is longer than the latter guard portion the guard portions can expand to accommodate any existing saw bar length.

Guard portion 20b is provided with a looped handle portion 48 projecting laterally on one side surface thereof and being disposed adjacent its inner end. Since some saw bars may be of six feet or longer, it may not be convenient for the operator to grasp the end handle loop 26a. Thus the loop 48 may be utilized instead of the end loop.

Similar to the FIGURE 1 embodiment the guard is provided with a resilient pad 36 on a side surface thereof for engaging the operator's shoulder when the guard is being carried. Also, the guard is removably held on the housing 10 by spring means 28.

In accordance with the present invention, a guard is provided for chain saws wherein the saw bar is covered when the saw is not in use. Thus the saw can be readily carried or otherwise manipulated by the operator without danger of injury to himself or without damage to the saw itself. The pad 36 also provides a soft shoulder engaging portion for the operator. The present guard is constructed of any suitable material which is light in weight and affords good protection, such as aluminum, plastic, or the like.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. A guard for chain saw mechanisms of the type having a motor housing and an elongated saw bar having a continuous chain saw operative therearound, comprising a tubular housing having an outer end and an open inner end adapted to telescopically fit over the saw bar to cover the same, a grip handle on the outer end of said tubular housing for carrying the saw with said guard thereon, and means on said saw guard adapted for removably attaching the latter to a motor housing of the chain saw mechanism.

2. The guard of claim 1 wherein said means for removably attaching said guard to the motor housing comprises a tension spring.

3. The guard of claim 1 including a resilient pad on said saw guard intermediate the ends thereof forming a shoulder engaging cushion for the operator when carrying the saw.

4. The guard of claim 1 including an enlarged inner end housing arranged on said tubular housing for enclosing a portion of the saw when said guard is in place on the saw bar.

5. The guard of claim 1 wherein said guard comprises a pair of telescoping portions for fitting over saw bars of varying lengths.

6. The guard of claim 1 wherein said guard comprises a pair of telescoping portions spring biased into telescoping relation with each other and movable relative to each other for fitting over saw bars of different lengths.

7. The guard of claim 6 wherein one of said telescoping portions is removably attached to the motor housing of the saw and said other telescoping portion is supported thereon, said grip handle being on the telescoping member which is removably attached to the saw.

References Cited

UNITED STATES PATENTS

| | | | |
|---|---|---|---|
| 2,638,944 | 5/1953 | Woleslagle | 143—32 |
| 2,792,670 | 5/1957 | Haynes | 143—213 X |
| 3,042,087 | 7/1962 | Otoupalik | 143—32 |

DONALD R. SCHRAN, *Primary Examiner.*